No. 698,376. Patented Apr. 22, 1902.
W. A. CROWDUS.
MOTOR VEHICLE FRAME.
(Application filed June 25, 1901.)

(No Model.) 2 Sheets—Sheet 1.

Witnesses: Inventor:
Walter A. Crowdus,
By
Atty

No. 698,376. Patented Apr. 22, 1902.
W. A. CROWDUS.
MOTOR VEHICLE FRAME.
(Application filed June 25, 1901.)
(No Model.) 2 Sheets—Sheet 2.
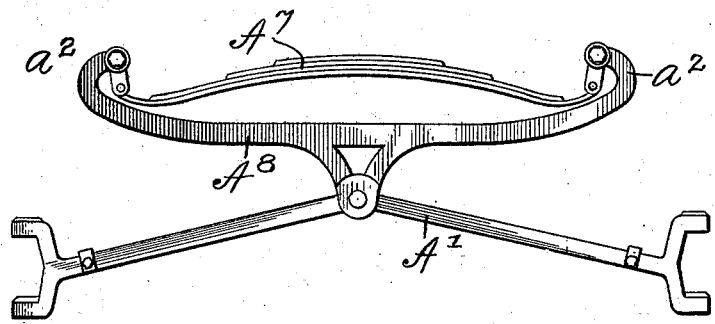
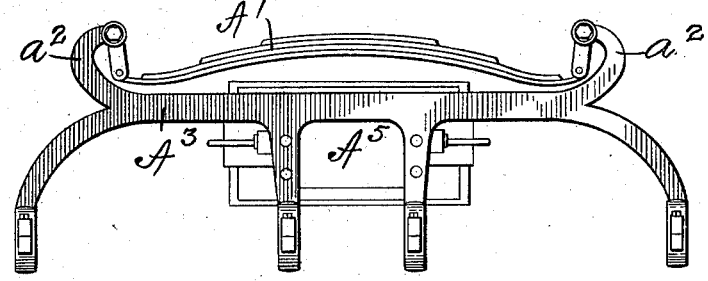
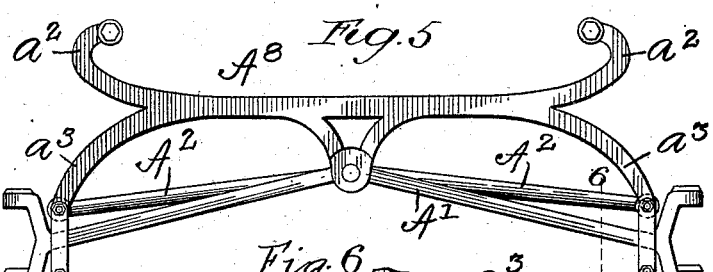
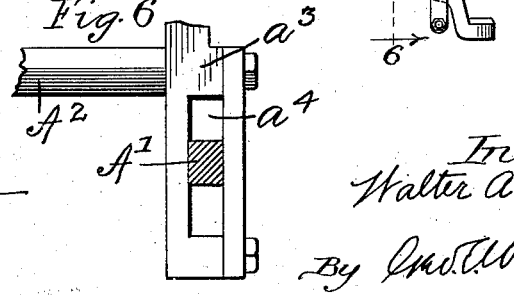
Witnesses
Harold G. Barrett
Inventor
Walter A. Crowdus

UNITED STATES PATENT OFFICE.

WALTER A. CROWDUS, OF CHICAGO, ILLINOIS.

MOTOR-VEHICLE FRAME.

SPECIFICATION forming part of Letters Patent No. 698,376, dated April 22, 1902.

Application filed June 25, 1901. Serial No. 65,941. (No model.)

*To all whom it may concern:*

Be it known that I, WALTER A. CROWDUS, a citizen of the United States, and a resident of Chicago, in the county of Cook and State of Illinois, have invented an Improved Motor-Vehicle Frame, of which the following is a specification.

This invention relates to motor-vehicles, and relates particularly to running-gears or underframes for motor-vehicles of the general type shown and described in an application for United States Letters Patent heretofore filed by me in the Patent Office on August 17, 1898, and numbered serially 688,525. An objectionable feature of the frame which forms the subject-matter of said prior application, No. 688,525, is that the reach is continuous between the front and rear axles, thus necessitating supporting the motor beneath or above the reach. The resulting structure does not look well, and the motor hangs so low when beneath the axle that it is liable to strike obstructions in the road.

A primary object of this invention is to remedy the above objectionable feature in vehicle-gears of this type; and to this end the invention consists in the use of a reach which terminates in front of the rear axle, thus forming an opening between the lateral members of the frame adapted to receive or accommodate the motor, which may thus be supported at any desired elevation.

The invention also consists of the various other features, combinations of features, and details of construction hereinafter described and claimed.

Figure 1:
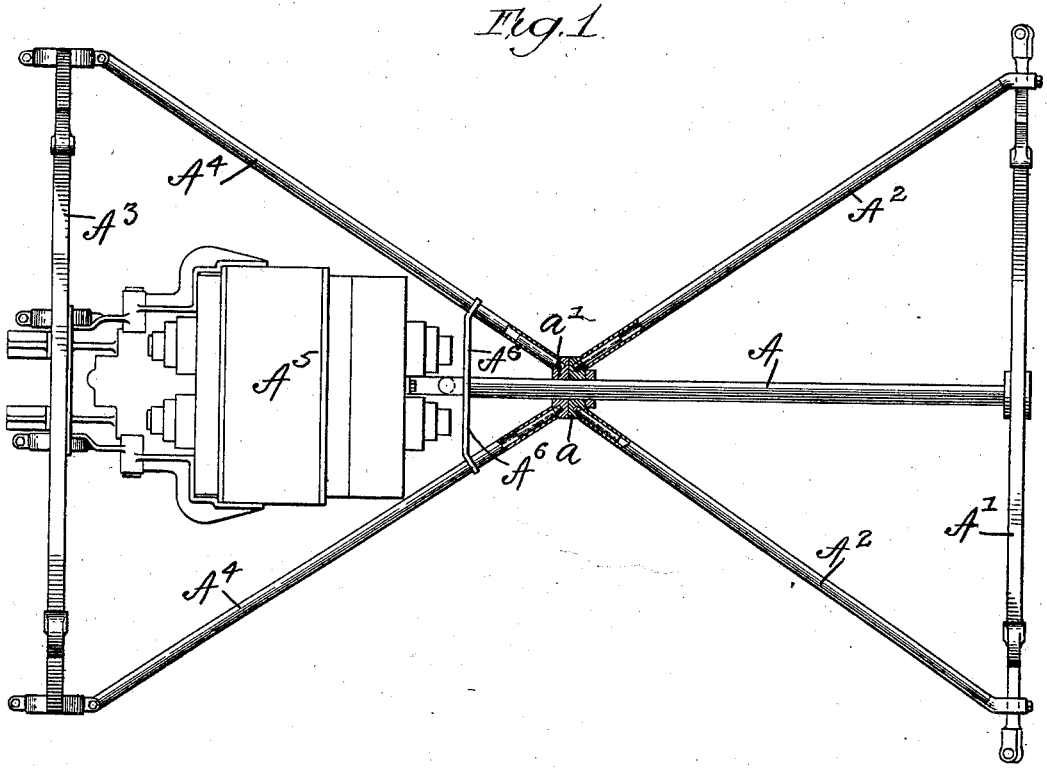
Figure 2:
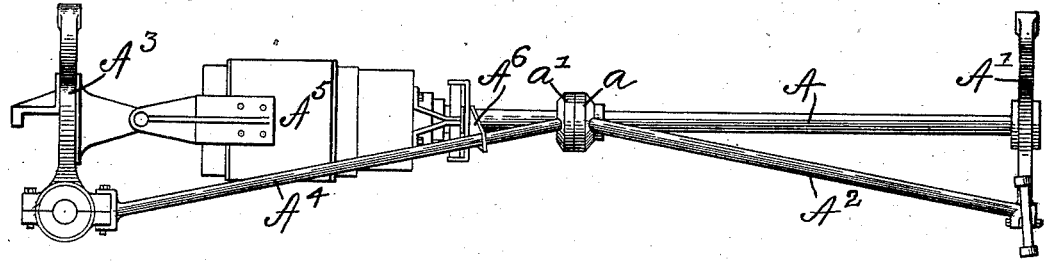

In the accompanying drawings, Figure 1 is a top plan view, partly in section, of a vehicle-frame of my invention. Fig. 2 is a side view thereof, and Figs. 3 and 4 are respectively front and rear end views thereof. Fig. 5 is a front view of a modified form of vehicle-frame embodying my invention, and Fig. 6 is a sectional view thereof on the line 6 6 of Fig. 5.

Referring now to the drawings, A designates the reach of a vehicle-gear of my invention; A', the front axle thereof, preferably pivoted to the forward end of said reach A; $A^2$, truss-rods or struts which connect the front axle A' with a collar $a$ on the reach A and preferably revoluble relatively thereto; $A^3$, a rear-axle support or bolster; $A^4$, truss-rods or struts which connect said axle support or bolster $A^3$ with a head or collar $a'$ on the reach A.

Except as hereinafter pointed out, the foregoing elements are substantially the same in construction and function as the corresponding elements of the gear which is the subject-matter of said prior application, No. 688,525, and will be readily understood by persons familiar with the art without a detailed description thereof.

The principal feature of difference between the gear which forms the subject-matter of said prior application, No. 688,525, and that which forms the subject-matter of the present application is that in said prior application the reach is continuous between the front and rear axles and is connected directly to both thereof, whereas in the present application the reach A terminates in front of the rear axle, thus forming the desired unobstructed space to receive a motor. For purposes of illustration I have in the drawings indicated a motor supported in operative position, said motor being designated by the reference-letter $A^5$.

A further advantageous feature of a gear embodying my present invention is that the rear end of the reach A affords a convenient support for the motor $A^5$, said motor being supported upon and preferably rigidly secured to the rear end of the reach A at its forward end and the rear-axle support or bolster $A^3$ at its rearward end, thus with the reach forming a rigid connection between the front and rear axles or their supports.

When the motor is secured to the reach A, said reach is preferably reinforced or strengthened by a brace $A^6$, rigidly secured thereto and to the truss-rods or struts $A^4$.

A further feature of difference between my present gear and that shown in said prior application is that in my present gear the truss-rods or struts $A^4$ instead of being attached directly to the rear axle, as in the gear of said prior application, are attached to the axle-support $A^3$. This is an obvious modification, however, for the purpose of adapting a gear of this general type for use in a vehicle having a revoluble rear axle instead of a fixed or non-revoluble axle, as in the gear of said prior application.

In the preferable construction shown the truss-rods or struts $A^4$ are secured to the rear-axle support below the reach A. This construction when combined with the motor supported upon and connecting the reach and the rear-axle support or bolster very greatly strengthens and stiffens the gear and particularly the rear-axle support against strains tending to turn said axle-support about the points of attachment of said truss-rods or struts thereto.

The vehicle-body (not shown) may be connected to and supported upon the vehicle-frame in any desired or approved manner. In the preferable construction shown the vehicle-body is designed to be supported upon springs $A^7$, hung from upward projections $a^2$ on the rear-axle support $A^3$ and on a front bolster or frame member $A^8$, preferably pivoted to the front axle $A'$, so as to provide for oscillation of the front axle relatively to and independently of the vehicle-body. The manner of supporting the vehicle-body forms no part of the present invention, and no claim thereto is made herein, the specific means shown being fully shown, described, and claimed in an application for United States Letters Patent filed by me in the Patent Office on June 25, 1901, and numbered serially 65,942.

In Fig. 5 of the drawings I have illustrated a gear embodying my invention in a modified form. In said modification of the invention the truss-rods or struts $A^2$ instead of being connected to the front axle $A'$ are connected to downward projections $a^3$ on the bolster or frame member $A^8$, said downward projections being preferably formed by the downwardly-curved ends of said bolster or frame member $A^8$. With this construction the front axle $A'$ is preferably pivoted to said bolster or frame member $A^8$, and it is maintained in transverse alinement by means of guide-slots $a^4$ in the downwardly-curved ends $a^3$ of said bolster or frame member $A^8$, which embrace said front axle adjacent to its ends, all substantially in the manner shown, described, and claimed in said application No. 65,942 and for that reason not herein claimed.

I claim—

1. A vehicle gear or underframe comprising front and rear transverse frame members, a reach secured to the front transverse frame member and terminating in front of the rear transverse frame member, truss-rods or struts which connect said rear transverse frame member with the reach at a distance from its rear end and a transverse brace which connects the rear end of said reach with said truss-rods or struts, substantially as described.

2. In a motor-vehicle, the combination of front and rear transverse frame members, a reach secured to the front transverse frame member and terminating in front of the rear transverse frame member, truss-rods or struts which connect said rear transverse frame member with said reach and a motor secured to the rear end of the reach and to the rear transverse frame member, substantially as described.

3. In a motor-vehicle, the combination of front and rear transverse frame members, a reach secured to the front transverse frame member and terminating in front of the rear transverse frame member, truss-rods or struts which connect said reach with said rear transverse frame member out of line vertically with said reach and a motor secured to the rear end of the reach and to the rear transverse frame member, substantially as described.

4. A vehicle gear or underframe comprising front and rear transverse frame members, a reach secured to said front frame member and terminating in front of said rear frame member and truss-rods or struts which connect said reach with said front and rear transverse frame members at points out of line vertically with said reach, substantially as described.

5. A vehicle gear or underframe comprising a rear-axle support, a central reach which terminates in front of said rear-axle support; diagonal struts or truss-rods which connect said rear-axle support at or adjacent to its ends with a head on said reach, a front axle pivoted to said reach, and diagonal struts or truss-rods which connect said front axle at or adjacent to its ends with a head revolubly secured to said reach, substantially as described.

6. A vehicle gear or underframe comprising a rear-axle support, a central reach which terminates in front of said rear-axle support, diagonal struts or truss-rods which connect said rear-axle support at or adjacent to its ends with said reach, a brace which connects said reach adjacent to its rear end with said struts or truss-rods, a front axle pivoted to said reach and diagonal struts or truss-rods which connect said front axle at or adjacent to its ends with a head revolubly secured to said reach, substantially as described.

In testimony that I claim the foregoing as my invention I affix my signature, in presence of two subscribing witnesses, this 22d day of June, A. D. 1901.

WALTER A. CROWDUS.

Witnesses:
JOHN A. McKEOWN,
M. S. SOMERVILLE.